United States Patent [19]

Okada

[11] Patent Number: 5,078,238
[45] Date of Patent: Jan. 7, 1992

[54] BRAKE SYSTEM
[75] Inventor: Masaki Okada, Fujisawa, Japan
[73] Assignee: Isuzu Motors Limited, Tokyo, Japan
[21] Appl. No.: 416,085
[22] Filed: Oct. 2, 1989
[30] Foreign Application Priority Data Oct. 31, 1988 [JP] Japan .................................. 63-273034

[51] Int. Cl.⁵ ............................................. F16F 11/00
[52] U.S. Cl. ..................................... 188/271; 123/320; 188/291
[58] Field of Search ............... 188/271, 272, 275, 280, 188/291, 293, 294; 123/320 X

[56] References Cited

U.S. PATENT DOCUMENTS 3,108,660 10/1963 Smith .................................... 188/271
3,155,197 11/1964 Lee et al. ............................. 188/271
3,302,755 2/1967 Botterill et al. ...................... 188/271
3,334,711 8/1967 Anderson ............................. 188/271

Primary Examiner—Robert J. Oberleitner
Assistant Examiner—Lee W. Young
Attorney, Agent, or Firm—Dykema Gossett

[57] ABSTRACT

The brake system comprises a shaft interposed between two propeller shaft segments via universal joints, a radial compressor selectively connected with the shaft, a casing for housing the radial compressor and the shaft with the universal joints being outside the casing, and stay members mounted on the casing for allowing the casing to be suspended from the vehicle body. The brake system has a radial compressor which is selectively connected with the propeller shaft and consumes energy of the engine. The energy consumed is a result of the compressor serving as a brake force. The casing is fixed to the vehicle body so that the brake system also serves as a center bearing of the propeller shaft.

13 Claims, 3 Drawing Sheets

BRAKE SYSTEM

BACKGROUND OF THE INVENTION

1. Technical Field

The present invention relates to a brake system adapted for use in a vehicle, and particularly to a brake system for applying a brake force to the power transmission line of the vehicle.

2. Background Art

Generally, a large amount of heat exchange takes place in braking large vehicles such as a large bus or truck, and usually such vehicles are equipped with an auxiliary brake system in addition to a main brake system (foot brake). In one type of the auxiliary brake system, such as an exhaust brake, the auxiliary brake system produces a force which is directed from the vehicle wheels toward the engine of the vehicle. The crankshaft of the engine is rotated by such a force, and thereby the engine is decelerated. In another type, a rotor is provided in a propeller shaft of the vehicle, which consumes energy from the engine when it is rotated by the engine so that the rotor applies brake force to the engine.

FIG. 4 illustrates an example of the auxiliary brake system of the latter type, which is generally called an "electrical retarder." The electrical retarder b has a casing, electromagnets and a rotor housed in the casing. An eddy current (Foucault current) is produced when the rotor rotates between the electromagnets, i.e., when the rotor rotates in the magnetic field. The electrical retarder b expels the eddy current (Foucault current) in the form of ohmic heat. It is advantageous to provide this brake system b between the propeller shafts a of the vehicle, since the electrical retarder b serves as a center bearing of the propeller shafts a. However, the rotor requires cooling since the electrical retarder generates a considerable amount of heat. A cooling device raises the cost of the auxiliary brake system and makes the arrangement complicated.

On the other hand, the assignee of the present invention developed another type of auxiliary brake system, namely a turbo compound engine which is disclosed in Japanese Patent Application No. 61-22817 (Laid Open No. 63-85222 (1989)). This patent application also teaches an arrangement employing a rotor. However, the rotor in this case is provided in the exhaust line of the engine and serves as an energy recovering element in one mode and a brake force producing element in the other mode. Also, it produces a brake force mechanically. The shortcoming of this arrangement is that a complicated mechanism for switching the function of the rotor is necessary.

SUMMARY OF THE INVENTION

One of the objects of the present invention is to provide a brake mechanism which is compact and simple in construction, does not require a cooling device and functions as a brake system only.

Another object of the present invention is to provide a brake mechanism which partially serves a propeller shaft of the vehicle.

According to one aspect of the present invention, there is provided a brake system adapted for use in a vehicle having a propeller shaft divisible in two segments, which comprises: a shaft ("input shaft" in the preferred embodiment) interposed between the propeller shaft segments as a part of the propeller shaft; a centrifugal compressor having a shaft ("drive shaft" in the preferred embodiment) parallel to the shaft (input shaft); a chain connecting the shaft (an input shaft) with the shaft of the compressor for transmitting a power to the compressor from the engine via the propeller shaft; a clutch provided between the input shaft and the compressor for selectively transmitting the power from the engine to the compressor; a casing for housing the input shaft with either end thereof being outside the casing; and stay members mounted on the casing for allowing the casing to be hung from the vehicle body. The input shaft is preferably coupled with the propeller shaft segments via universal joints respectively provided at the ends of the input shaft. In this arrangement, when the clutch connects the compressor with the propeller shaft, i.e., with the engine, the compressor consumes the energy of the engine, thereby applying a brake force to the engine. Since the input shaft serves as a part of the propeller shaft, the casing looks like a center bearing of the propeller shaft. The casing is fixed to the vehicle by the stay members.

DESCRIPTION OF THE PREFERRED EMBODIMENTS

A preferred embodiment of the present invention will be described with reference to the accompanying drawings.

Figure 1:
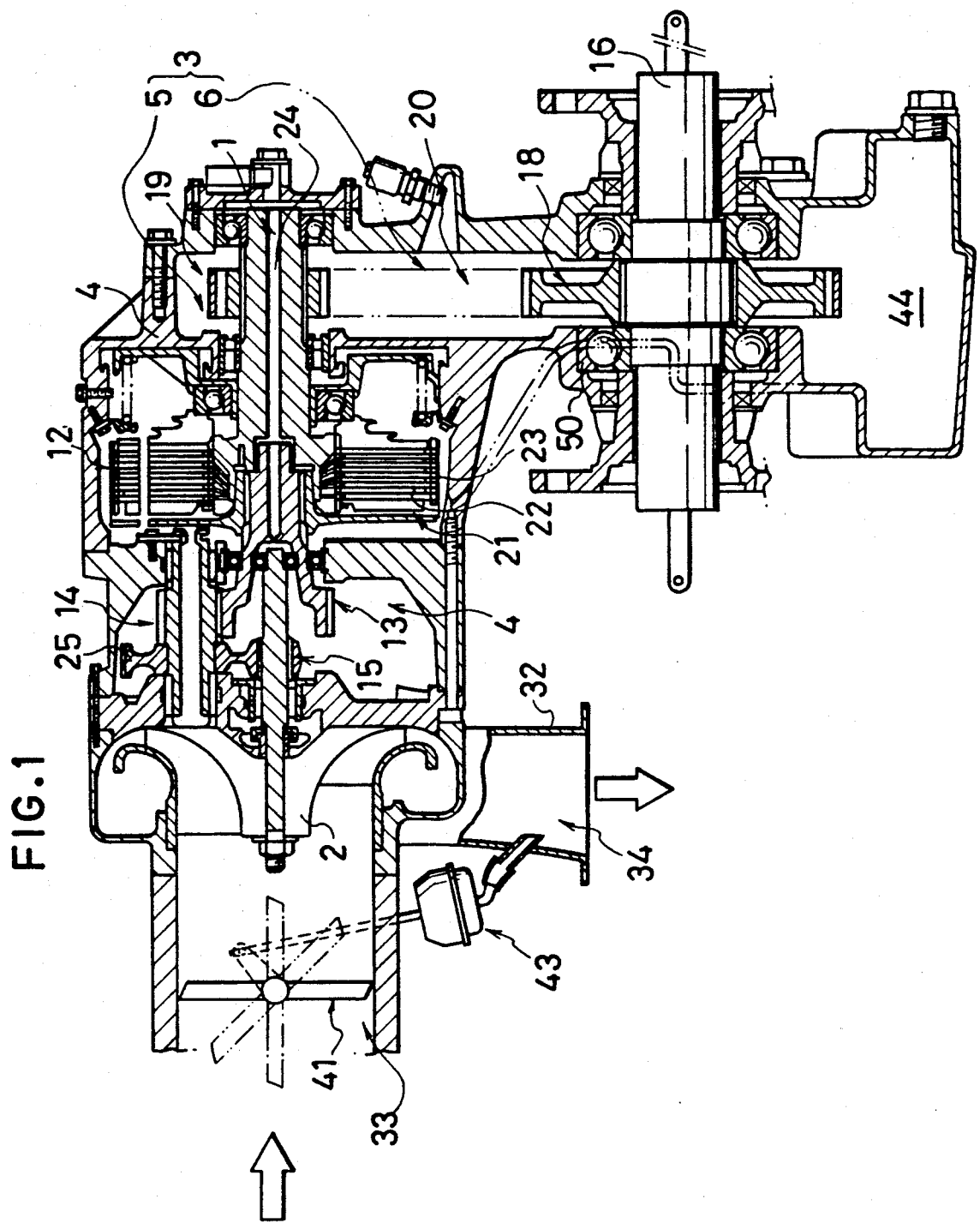
FIG. 1 is a sectional view of the brake device of the present invention.

Referring to FIG. 1, a power transmission line 3 of a brake system comprises two lines extending in a casing 4, namely a propeller shaft line 6 for branching energy transmitted from the engine (not shown) and a centrifugal compressor drive line 5 for transmitting the branched energy to a centrifugal compressor 15.

The centrifugal compressor drive line 5 extends above and parallel to the propeller shaft line 6. The compressor drive line 5 includes a clutch shaft 1, a coupling shaft 13, a multi-plate clutch 12, and intermediate shaft 14 and a compressor shaft 15, in a manner such that the clutch shaft 1 is coaxially connected with the coupling shaft 13 via the multi-plate clutch 12, and the coupling shaft 13 is connected with the compressor shaft 15 via the intermediate shaft 14.

The propeller shaft line 6 includes an input shaft 16 extending parallel to the clutch shaft 1 in the casing 4 with either end protruding from the casing 4, a first sprocket 19 fixed to the clutch shaft 1, universal joints 17 (FIG. 2) provided at each end of the input shaft 16 to be coupled with the propeller shaft a (FIG. 2), a second sprocket 18 fixed to the input shaft 16, and a chain 20 engaged over the first and second sprockets 18 and 19. The shaft 16 is supported by bearings at a position near the ends thereof.

Figure 2:
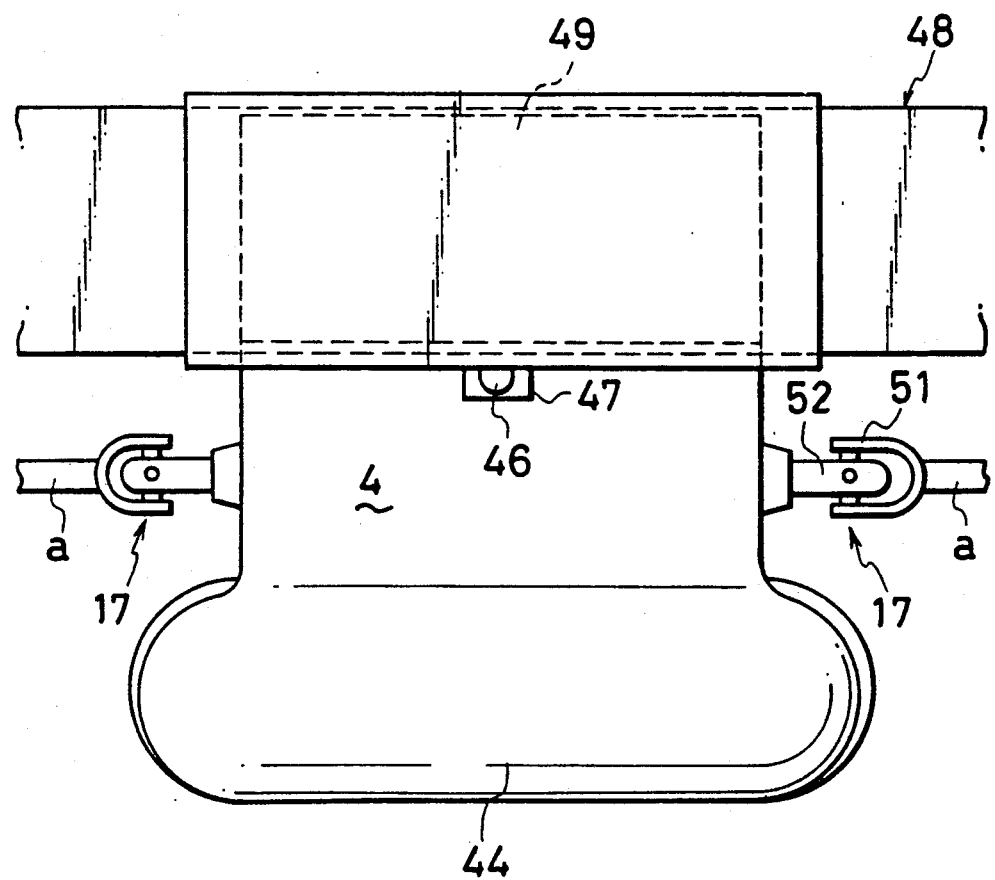
FIGS. 2 and 3 illustrate the brake device of FIG. 1 when it is provided in a propeller shaft and mounted on a vehicle body via stay members respectively.
Figure 4:
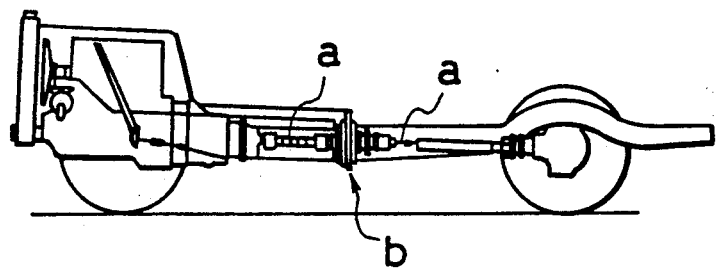
FIG. 4 illustrates a conventional auxiliary brake system.

The vehicle has a divisible propeller shaft, as in the illustration of FIG. 4, and the brake mechanism is provided between the propeller shaft segments a as shown in FIG. 2. Specifically, the input shaft is interposed between the propeller shaft segments a. Each universal joint 17 includes a joint member 52, which is coupled with another joint member 51 provided at one end of each propeller shaft segment a, and a bearing 50 (FIG. 1) supporting the input shaft 16 in the casing 4. The rotation ratio between the clutch shaft 1 and the input shaft 16 can be adjusted by changing the sprocket 18 and/or the sprocket 19 even if the distance between the clutch shaft 1 and the input shaft 16 is fixed. An oil pan 44 is mounted on the bottom of the main casing 4.

Referring back to FIG. 1, the multi-plate clutch 12 includes a clutch wheel 21 transmitting power to the coupling shaft 13, first clutch plates 22 transmitting power to the clutch wheel 21 and second clutch plates 23 frictionally engaging the first clutch plates 22 and transmitting power from the engine to the first clutch plates 22. The first clutch plates 22 and the second clutch plates 23 are alternatively disposed in the axial direction of the clutch shaft 1. The clutch shaft 1 is coupled with the coupling shaft 13 when the multi-plate clutch 12 is in an engaged mode, i.e., when the clutch plates 22 are pressed to the second clutch plates 23 by the pressure of the oil supplied from a passage 24 bored in the clutch shaft 1. The coupling shaft 13 is connected to the intermediate shaft 14 via gears, and the output gear 25 of an intermediate shaft 14 meshes with a gear of the centrifugal compressor shaft 15. A compressor casing 32 which houses the compressor 2 is attached to the main casing 4 in a manner such that the axial direction of the compressor 2 corresponds to the axial direction of the clutch shaft 1. The compressor casing 32 is an involute casing and has an inlet 33 in the axial direction of the compressor 2 and an outlet 34 in the radial direction thereof. A throttle valve 41 is disposed in the inlet 33, and the degree of throttling is adjusted by control means 43.

Figure 3:
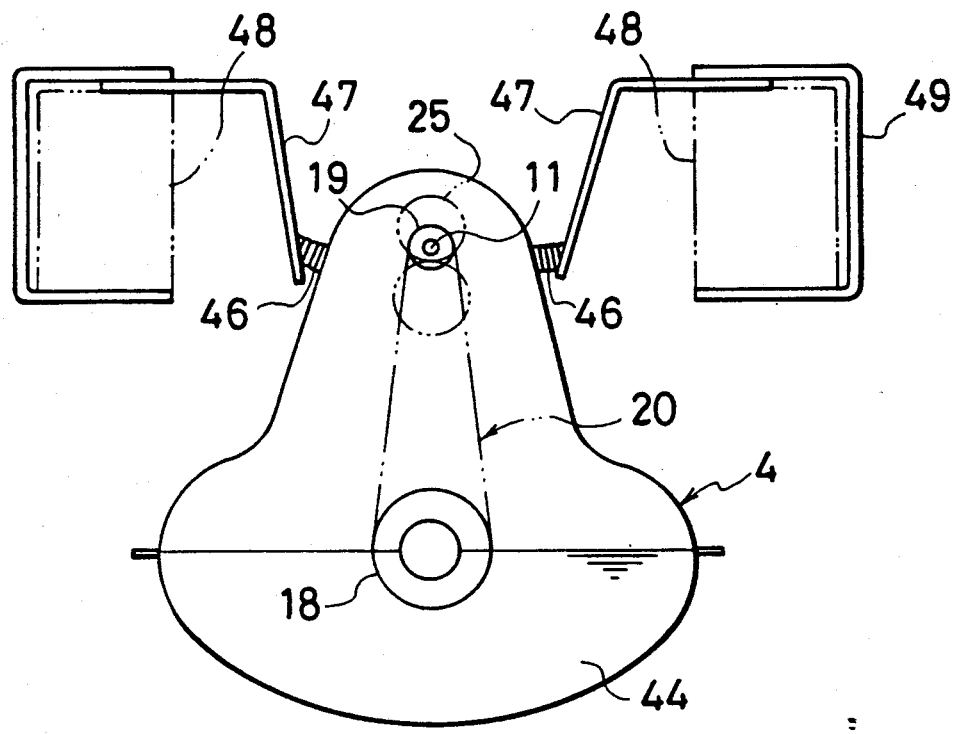

Referring to FIG. 3, a pair of stay members 47 are mounted on the casing 4 at the upper lateral walls of thereof via a pair of bushes 46 having elasticity in the lateral direction thereof (as viewed in the drawing). The stay members 47 are firmly mounted on a frame 48 of the vehicle by U-shaped members 49 at the other ends thereof. A clearance between the bottom of the oil pan 44 and the ground (not shown) is maintained due to the stay members 48 and the U-shaped members 49. The position of the casing 4 in the longitudinal direction of the vehicle is maintained constant by these members too. Therefore, the brake mechanism serves as a center bearing of the propeller shaft a.

Referring back to FIG. 1, when the clutch shaft 1 is coupled with the coupling shaft 13 by the clutch 12, the power from the engine (not shown) is branched from the input shaft 16 (or the propeller shaft) to the compressor shaft 15 via the endless chain 20, the clutch shaft 1, the coupling shaft 13 and the intermediate shaft 14, whereby the radial compressor 2 starts rotating. When the vehicle is running on a long downhill, for example, and the clutch 12 is in the engaged mode, the compressor 2 takes in air through the inlet 33, compresses the air at the impeller 61 and expels the air through the outlet 34. In other words, energy transmitted from the input shaft 16, i.e., the engine, is consumed by the compressor 2. The consumed energy serves as a brake force against the engine. The strength of the brake force is adjusted by the throttle valve 41.

What is claimed is:

1. A brake system adapted for use on a vehicle having an engine and a propeller shaft having two segments, said brake system comprising:

a first shaft having universal joints at each end thereof for allowing the first shaft to be coupled with the propeller shaft segments;

a radial compressor having a second shaft connected with the first shaft for applying a brake force to the propeller shaft when the radial compressor consumes the energy of the engine transmitted through the propeller shaft, the compressor taking in and expelling air when it consumes the energy of the engine;

a casing for housing the radial compressor and the first shaft, the casing having an inlet through which the air is taken into the compressor and an outlet through which the air is expelled from the compressor; and stay members attached to the casing for allowing the casing to be suspended from a body of the vehicle.

2. A brake system as defined in claim 1, including a multi-plate clutch interposed between the second shaft and the first shaft in a manner such that the clutch selectively connects the first shaft with the second shaft.

3. A brake system as defined in claim 1, wherein the second shaft is connected with the first shaft via a power transmission line which includes a multi-plate clutch.

4. A brake system as defined in claim 3, wherein the power transmission line includes the multi-plate clutch, a clutch shaft extending from the multi-plate clutch, a first sprocket fixed on the clutch shaft, a second sprocket fixed on the first shaft, an endless chain connecting the first sprocket with the second sprocket, a coupling shaft extending from the multi-plate clutch and an intermediate shaft rotating with the coupling shaft and the second shaft.

5. A brake system as defined in claim 1, wherein each of the stay members has a mounting bush at one end thereof and a U-shaped member at the other end thereof in a manner such that each stay member is attached to the lateral wall of the casing via the mounting bush and fixed to the vehicle body by the U-shaped member.

6. A brake system adapted for use on a vehicle having an engine and a propeller shaft having two segments, said brake system comprising:

a first shaft interposed between the propeller shaft segments in a manner such that it serves as a part of the propeller shaft;

a rotor connected with the first shaft for applying a brake force to the propeller shaft when it consumes energy of the engine transmitted through the propeller shaft, the rotor taking in and expelling air when it consumes the energy of the engine;

a casing for housing the rotor and the first shaft, the casing having an inlet through which the air is taken into the rotor and an outlet through which the air is expelled from the rotor; and means attached to the casing for allowing the casing to be suspended from a body of the vehicle.

7. A brake system as defined in claim 6, wherein a multi-plate clutch is interposed between the impeller shaft and the first shaft in a manner such that it selectively connects the impeller shaft with the first shaft.

8. A brake system adapted for use on a vehicle having an engine and a propeller shaft having two segments, said brake system comprising:

a first shaft having universal joints at each end thereof for allowing the first shaft to be coupled with the propeller shaft segments;

means for branching energy of the engine transmitted through the propeller shaft and for changing a rotational speed of the first shaft;

a radial compressor having a second shaft connected with the first shaft via the energy branching and rotational speed changing means for applying a brake force to the propeller shaft when the radial compressor consumes the energy branched from the propeller shaft, the compressor taking in and expelling air when the compressor consumes the energy of the propeller shaft;

a casing for housing the radial compressor and the first shaft, the casing having an inlet through which air is taken into the compressor and an outlet through which the air is expelled from the compressor when the compressor consumes the energy of the propeller shaft; and stay members attached to the casing for allowing the casing to be suspended from a body of the vehicle.

9. A brake system as defined in claim 8, including a multi-plate clutch interposed between the second shaft and the first shaft in a manner such that the clutch selectively connects the first shaft with the second shaft.

10. A brake system as defined in claim 8, wherein the second shaft is connected with the first shaft via a power transmission line which includes a multi-plate clutch.

11. A brake system as defined in claim 10, wherein the power transmission line includes a multi-plate clutch, a clutch shaft extending from the multi-plate clutch, a first sprocket fixed on the clutch shaft, a second sprocket fixed on the first shaft, an endless chain connecting the first sprocket with the second sprocket, a coupling shaft extending from the multi-plate clutch and an intermediate shaft rotating with the coupling shaft and the second shaft.

12. A brake system as defined in claim 8, wherein each of the stay members has a mounting bush at one end thereof and a U-shaped member at the other end thereof in a manner such that each stay member is attached to the lateral wall of the casing via the mounting bush and fixed to the vehicle body by the U-shaped member.

13. A brake system as defined in claim 8, wherein said speed changing means includes a first sprocket connected with said second shaft, a second sprocket smaller than the first sprocket and connected with said first shaft, and a chain engaged over said first and second sprockets.

* * * * *